(12) United States Patent
Wilkinson et al.

(10) Patent No.: US 7,257,007 B2
(45) Date of Patent: Aug. 14, 2007

(54) SPACERS FOR CELLS HAVING SPACED OPPOSED SUBSTRATES

(75) Inventors: Timothy D Wilkinson, Cambridge (GB); William A Crossland, Cambridge (GB); Tat C B Yu, Cambridge (GB)

(73) Assignee: Qinetiq Limited, London (GB)

( * ) Notice: Subject to any disclaimer, the term of this patent is extended or adjusted under 35 U.S.C. 154(b) by 709 days.

(21) Appl. No.: 10/084,652

(22) Filed: Feb. 28, 2002
(Under 37 CFR 1.47)

(65) Prior Publication Data

US 2003/0161126 A1    Aug. 28, 2003

Related U.S. Application Data

(63) Continuation of application No. 09/868,306, filed on Jun. 18, 2001, now abandoned.

(30) Foreign Application Priority Data

Dec. 16, 1999   (GB)   ................................. 9827900.3

(51) Int. Cl.
*H01R 12/16*   (2006.01)
*H05K 1/11*   (2006.01)
(52) U.S. Cl. ...................... 361/788; 361/804
(58) Field of Classification Search ................ 361/760, 361/766, 767, 770, 771, 783, 788, 804, 742, 361/762; 257/301–303, 350; 359/59, 87, 359/88, 8; 349/153, 155, 156, 84, 110, 139
See application file for complete search history.

(56) References Cited

U.S. PATENT DOCUMENTS

| | | | | |
|---|---|---|---|---|
| 4,538,884 A | * | 9/1985 | Masaki | 349/28 |
| 4,908,584 A | * | 3/1990 | Reichman | 349/26 |
| 4,925,276 A | * | 5/1990 | McMurray et al. | 349/28 |
| 4,941,735 A | * | 7/1990 | Moddel et al. | 349/29 |
| 5,111,320 A | * | 5/1992 | Wysocki et al. | 349/143 |
| 5,497,258 A | * | 3/1996 | Ju et al. | 349/58 |
| 5,537,234 A | * | 7/1996 | Williams et al. | 349/42 |
| 5,646,702 A | * | 7/1997 | Akinwande et al. | 349/69 |
| 5,739,890 A | * | 4/1998 | Uda et al. | 349/156 |
| 5,838,414 A | * | 11/1998 | Lee | 349/157 |
| 5,902,165 A | * | 5/1999 | Levine et al. | 445/24 |
| 5,919,606 A | * | 7/1999 | Kazlas et al. | 430/321 |

(Continued)

*Primary Examiner*—Vit Miska
*Assistant Examiner*—Thanh S. Phan
(74) *Attorney, Agent, or Firm*—Nixon & Vanderhye P.C.

(57) ABSTRACT

In an active semiconductor backplane for a liquid crystal spatial light modulator, spacers (25) which are distributed over the backplane extend above an array of electrical and/or electronic elements and comprise at least two layers essentially of the same material and occuring in the same order as is found in at least one of the electrical or electronic elements, such as an NMOS transistor (52). The latter is formed from a stack of layers on a silicon substrate (51) comprising polysilicon (56), continuous silicon oxide (57) modified to include gate oxide GOX (55), metallic gate electrode (59), continuous silicon oxide (58) and a metallic drain electrode (60) which is coupled to a spaced mirror electrode over the layer (58). Likewise, spacer (25) comprises the layers (57 and 58) with metallic (67, 68) deposited simultaneously with electrodes (59, 60). The foot of layer (57) is differently modified to include field oxide layer (69) and polysilicon layers thin oxide (71). Spacers (25) are located regularly within the array of transistors (25)/mirrors (65) and also about the array.

33 Claims, 5 Drawing Sheets

U.S. PATENT DOCUMENTS

| | | | |
|---|---|---|---|
| 6,080,606 A * | 6/2000 | Gleskova et al. | 438/151 |
| 6,275,280 B1 * | 8/2001 | Kajita et al. | 349/155 |
| 6,317,188 B1 * | 11/2001 | Shibahara | 349/155 |
| 6,373,547 B2 * | 4/2002 | Saito et al. | 349/155 |
| 6,476,886 B2 * | 11/2002 | Krusius et al. | 349/73 |
| 6,521,475 B1 * | 2/2003 | Chen et al. | 438/34 |
| 2002/0003519 A1 * | 1/2002 | Kim | 345/87 |

* cited by examiner ellites for cells having spaced
SPACERS FOR CELLS HAVING SPACED OPPOSED SUBSTRATES This application is a continuation of application Ser. No. 09/868,306, filed Jun. 18, 2001 now abandoned, the entire content of which is hereby incorporated by reference in this application.

BACKGROUND OF THE INVENTION

1. Field of the Invention

The present invention relates to active backplanes for use with a spaced opposed front electrode, and to devices comprising such backplanes.

2. Discussion of Prior Art

The device which is particularly described in this specification in connection with a preferred embodiment is a spatial light modulator in the form of a smectic liquid crystal layer disposed between an active semiconductor backplane and a common front electrode. It was developed in response to a requirement for a fast and, if possible, inexpensive, spatial light modulator comprising a relatively large number of pixels with potential application not only as a display device, but also for other forms of optical processing such as correlation and holographic switching. Our copending International Patent Applications (PCT/GB99/04285, U.S. Ser. No. 09/868,219, priority GB9827952.4; PCT/GB99/04276, U.S. Ser. Nos. 09/868,239 and 09/868,220, priority GB9827965.6; PCT/GB99/04279, U.S. Ser. No. 10/085,140, priority GB9827901.1; PCT/GB 99/04274, U.S. Ser. No. 09/868,218, priority GB9827964.9; PCT/GB99.04275, U.S. Ser. No. 09/868,217, priority GB9827945.8; and PCT/GB99/04760 and PCT/GB99/04277, U.S. Ser. Nos. 09/868, 241 and 09/868,242, both priority GB9827944.1) relate to other inventive aspects associated with the spatial light modulator.

During the course of development of the present invention, a series of problems were encountered and dealt with, and the solutions to these problems (whether in the form of construction, function or method) are not necessarily restricted in application to the embodiment, but will find other uses. Thus not all of the aspects of the invention are limited to liquid crystal devices, nor to spatial light modulators.

Nevertheless, it is useful to commence with a discussion of the problems encountered in developing the embodiment to be described later.

The liquid crystal phase has been recognised since the last century, and there were a few early attempts to utilise liquid crystal materials in light modulators, none of which gave rise to any significant successful commercial use. However, towards the end of the 1960's and in the 1970's, there was a renewed interest in the use of liquid crystal materials in light modulating, with increasing success as more materials, and purer materials became available, and as technology in general progressed.

Generally speaking, this latter period commenced with the use of nematic and cholesteric liquid crystal materials. Cholesteric liquid crystal materials found use as sensors, principally for measuring temperature or indicating a temperature change, but also for responding to, for example, the presence of impurities. In such cases, the pitch of the cholesteric helix is sensitive to the parameter to be sensed and correspondingly alters the wavelength at which there is selective reflection of one hand of circularly polarised light by the helix.

Attempts were also made to use cholesteric materials in electro-optic modulators, but during this period the main thrust of research in this area involved nematic materials. Initial devices used such effects as the nematic dynamic scattering effect, and increasingly sophisticated devices employing such properties as surface induced alignment, the effect on polarised light, and the co-orientation of elongate dye molecules or other elongate molecules/particles, came into being.

Some such devices used cells in which the nematic phase adopted a twisted structure, either by suitably arranging surface alignments or by incorporating optically active materials in the liquid crystal phase. There is a sense in which such materials resemble cholesteric materials, which are often regarded as a special form of the nematic phase.

Initially, liquid crystal light modulators were in the form of a single cell comprising a layer of liquid crystal material sandwiched between opposed electrode bearing plates, at least one of the plates being transparent. The thickness of the liquid crystal layer in nematic cells is commonly around 20 to 100 microns.

At a later stage, electro-optic nematic devices comprising a plurality of pixels were being devised. Initially, these had the form of a common electrode on one side of a cell and a plurality of individually addressable passive electrodes on the other side of the cell (e.g. as in a seven-segment display), or, for higher numbers of pixels, intersecting passive electrode arrays on either side of the cell, for example row and column electrodes which were scanned. While the latter arrangements provided considerable versatility, there were problems associated with cross-talk between pixels.

The situation was exacerbated when analogue (grey scale) displays were required by analogue modulation of the applied voltage, since the optical response is non-linearly related to applied voltage. Addressing schemes became relatively complicated, particularly if dc balance was also required. Such considerations, in association with the relative slowness of switching of nematic cells, have made is difficult to provide real-time video images having a reasonable resolution.

Subsequently, active back-plane devices were produced. These comprise a back plane comprising a plurality of active elements, such as transistors, for energising corresponding pixels. Two common forms are thin film transistor on silica/glass backplanes, and semiconductor backplanes. The active elements can be arranged to exercise some form of memory function, in which case addressing of the active element can be accelerated compared to the time needed to address and switch the pixel, easing the problem of displaying at video frame rates.

Active backplanes are commonly provided in an arrangement very similar to a dynamic random access memory (DRAM) or a static random access memory (SRAM). At each one of a distributed array of addressable locations, a SRAM type active backplane comprises a memory cell including at least two coupled transistors arranged to have two stable states, so that the cell (and therefore the associated liquid crystal pixel) remains in the last switched state until a later addressing step alters its state. Each location electrically drives its associated liquid crystal pixel, and is bistable per se, i.e. without the pixel capacitance. Power to drive the pixel to maintain the existing switched state is obtained from busbars which also supply the array of SRAM locations. Addressing is normally performed from peripheral logic via orthogonal sets (for example column and row) addressing lines.

In a DRAM type active backplane, a single active element (transistor) is provided at each location, and forms, together with the capacitance of the associated liquid crystal pixel, a charge storage cell. Thus in this case, and unlike a SRAM backplane, the liquid crystal pixels are an integral part of the DRAM of the backplane. There is no bistability associated with the location unless the liquid crystal pixel itself is bistable, and this is not the case so far as nematic pixels are concerned. Instead, reliance is placed on the active element providing a high impedance when it is not being addressed to prevent leakage of charge from the capacitance, and on periodic refreshing of the DRAM location.

Thin film transistor (TFT) backplanes comprise an array of thin film transistors distributed on a substrate (commonly transparent) over what can be a considerable area, with peripheral logic circuits for addressing the transistors, thereby facilitating the provision of large area pixellated devices which can be directly viewed. Nevertheless, there are problems associated with the yields of the backplanes during manufacture, and the length of the addressing conductors has a slowing effect on the scanning. When provided on a transparent substrate, such as of glass, TFT arrays can actually be located on the front or rear surface of a liquid crystal display device.

In view of their overall size, the area of the TFT array occupied by the transistors, associated conductors and other electrical elements, e.g. capacitors is relatively insignificant. There is therefore no significant disadvantage in employing the SRAM configuration as opposed to the DRAM configuration. This sort of backplane thus overcomes many of the problems associated with slow switching times of liquid crystal pixels.

Generally, the active elements in TFT backplanes are diffusion transistors and the like as opposed to FETS, so that the associated impedances are relatively low and associated charge leakage relatively high in the "OFF" state.

Semiconductor active backplanes are limited in size to the size of semiconductor substrate available, and are not suited for direct viewing with no intervening optics. Nevertheless their very smallness aids speed of addressing of the active elements. This type of backplane commonly comprises FETs, for example MOSFETs or CMOS circuitry, with associated relatively high impedances and relatively low associated charge leakage in the "OFF" state.

However, the smallness also means that the area of the overall light modulation (array) area occupied by the transistors, associated conductors and other electrical elements, e.g. capacitors can be relatively significant, particularly in the SRAM type which requires many more elements than the DRAM type. Being opaque to visible light, a semiconductor backplane would provide the rear substrate of a light modulator or display device.

At a later period still, substantial development occurred in the use of smectic liquid crystals. These have potential advantages over nematic phases insofar as their switching speed is markedly greater, and with appropriate surface stabilisation the ferroelectric smectic C phases should provide devices having two stable alignment states, i.e. a memory function.

The thickness of the layer of liquid crystal material in such devices is commonly much smaller than in the corresponding nematic devices, normally being of the order of a few microns at most. In addition to altering the potential switching speed, this increases the unit capacitance of a pixel, easing the function of a DRAM active backplane in retaining a switched state at a pixel until the next address occurs.

However, as the thickness of the liquid crystal approaches the dimensions associated with the underlying structure of the backplane and/or the magnitude of any possible deformation of the liquid crystal cell structure by flexing or other movement of the substrates, problems arise, for example as to the uniformity of response across the pixel area, and the capability for short circuiting across the cell thickness. The alignment in chiral smectic liquid crystal cells is also frequently very sensitive to mechanical factors, and can be destroyed by mechanical impulses or shock.

Substrate Spacing

It is commonly necessary to ensure a correct and stable spacing between the two substrates of a cell incorporating an electrical backplane, for example an active backplane, and this is particularly so in the case of smectic liquid crystal cells in view of the thinness of the liquid crystal layer.

Earlier known methods of controlling substrate spacing, such as the provision of randomly distributed spacers, for example in the form of beads, across the area of the cell, or beads distributed in the peripheral seal, are not always appropriate for the device in question, particularly when the substrate spacing is small and one or both substrates carry electrical conducting elements.

Besides the mechanical effect of the spacers, which could cause damage to the backplane when assembling the device, it is not uncommon for added spacers to include conductive impurities which could short circuit one or more pixels. Furthermore, random distribution of the spacers would lead to their presence on individual pixels, the addition of defects and voids, and degradation of the liquid crystal alignment

SUMMARY OF THE INVENTION

The invention provides a backplane comprising an array of electrical or electronic elements and at least one separate spacer which rises higher over the backplane than said array and comprises at least two layers essentially of the same material and occurring in the same order as is found in at least one of the electrical or electronic elements. In the embodiment to be described below, the spacer is laterally spaced from an adjacent associated active element of a semiconductor backplane.

The spacers may comprise a series of more than two layers, and it is possible that not all of these layers are found in the said electrical or electronic element. Similarly, it is possible that not all of the layers in the electronic element are found in the spacers. It is also possible that some layers which do generally correspond in the spacers and element are modified in one or other thereof (for example by including a dopant, or an implanted or modified region within the layer itself). Nevertheless, as a general principle, there will be found in a spacer a second spacer layer which overlies, not necessarily directly, a first spacer layer, and there will be found in an electric or electronic element of the backplane a second backplane layer which overlies, not necessarily directly, a first backplane layer, the first spacer and backplane layers being identical or recognisable modifications one of another, and the second spacer and backplane layers being identical or recognisable modifications one of another.

In practice, in order to gain the necessary height over the active elements, as many of the foundry processes as are needed, possibly all of them, are used in forming the spacers. It is also preferred to avoid any further layers in the spacers which are not found in the electrical or electronic element and so add to the foundry process. Thus, most preferably, the layers in the spacers correspond in material and order to those found the said at least one electrical or electronic element.

While, in theory at least, the deposition of the spacer elements could be performed after the backplane has been made, the ordering and material of the spacers means that it is possible to produce the spacer elements on the backplane at the same time, and using the same set of materials and processes, as the backplane is being formed by semiconductor foundry process.

Thus the invention in its second aspect also provides a method of producing a backplane having at least one region containing an array of electrical or electronic elements, wherein the processes used for making parts of at least one said element are also used simultaneously to form parts of spacers on the backplane.

The locations of the array are commonly provided with means of address, for example, busbars extending from logic external to the array. As previously discussed these bus bars are preferably spaced from, rather than being immediately adjacent to, the array, although either is possible when considering substrate spacing.

Preferably the backplane is an active backplane in which the array comprises active electronic elements. Preferably the backplane is a semiconductor backplane. Preferably the spacers are provide electrical insulation along their height.

Preferably, the spacers, which may be in the form of columns, are regularly distributed over the array. Where the array provides a plurality of addressable locations, preferably each location has at least one, and more preferably only one, spacer associated therewith.

It is also or alternatively possible to provide such spacers externally of the array. One particular application thereof would be to provide spacers at the periphery of the array. These spacers could also be in the form of columns, or, for example, elongate ridges. Where glue lanes are present as discussed above, the spacers could be located in the glue lanes, and so lie within the seal between two spaced substrates of a cell.

European Patent Application No 89312169.9 (Seiko Instruments) describes a liquid crystal device in which spacers are formed within the width of column electrodes on a first substrate by deposition thereon of (thick) insulating films, and subsequent deposition over the whole of the first substrate of a continuous thin silicon oxide layer. In the assembled cell, the latter abuts a like continuous thin silicon oxide film in a region of a second substrate where transparent column electrodes are absent.

However, in the above construction there are no active electronic or electrical elements, nor even passive elements apart from the provision of electrodes, their associated addressing conductors, and the continuous overlying silicon oxide layers. The spacers are not separate from the conductors but are formed directly above, and include, parts of the column electrodes. Lateral displacement of the spacers away from the contact with the remainder of the column electrodes would destroy the function of the latter. Hence the proposed construction neither comprises spacers which are laterally spaced or otherwise separate from the electronic/electrical elements, nor lends itself to any obvious adaptation to give such separation.

European Patent Application No 93916162.6 (Toshiba) describes a thin film transistor (TFT) array formed together with spaced control circuits on a common substrate. Conductors coupled between the array and the circuits are locally thickened to provide a spacing function, but are not separate therefrom.

BRIEF DESCRIPTION OF THE DRAWINGS

Further features and advantages of the invention can be derived from a consideration of the appended claims, to which the reader is referred, and of the following description of an embodiment of the invention made with reference to the accompanying drawings, in which:

DETAILED DISCUSSION OF THE EMBODIMENTS

Figure 1:
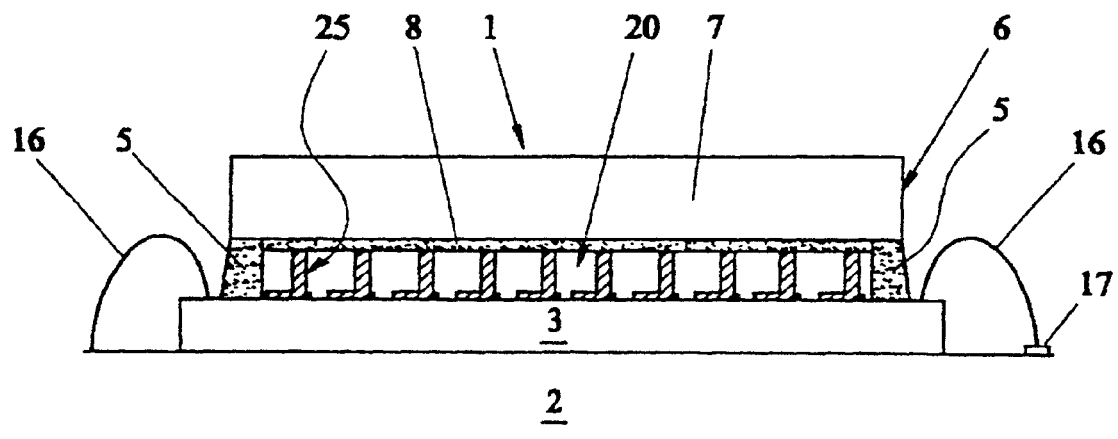
FIG. 1 shows in schematic cross-sectional view a liquid crystal cell which incorporates an active backplane and is mounted on a substrate.

FIG. 1 shows in schematic cross-sectional view a liquid crystal cell 1 mounted on a thick film alumina hybrid substrate or chip carrier 2. The cell 1 is shown in exploded view in FIG. 2. The use of a hybrid substrate for mounting electro-optic devices is discussed in more detail in our copending application U.S. Ser. No. 09/868,219.

Cell 1 comprises an active silicon backplane 3 in which a central region is formed to provide an array 4 of active mirror pixel elements arranged in 320 columns and 240 rows. Outside the array, but spaced from the edges of the backplane 3, is a peripheral glue seal 5, which seals the backplane 3 to the peripheral region of a front electrode 6.

Figure 2:
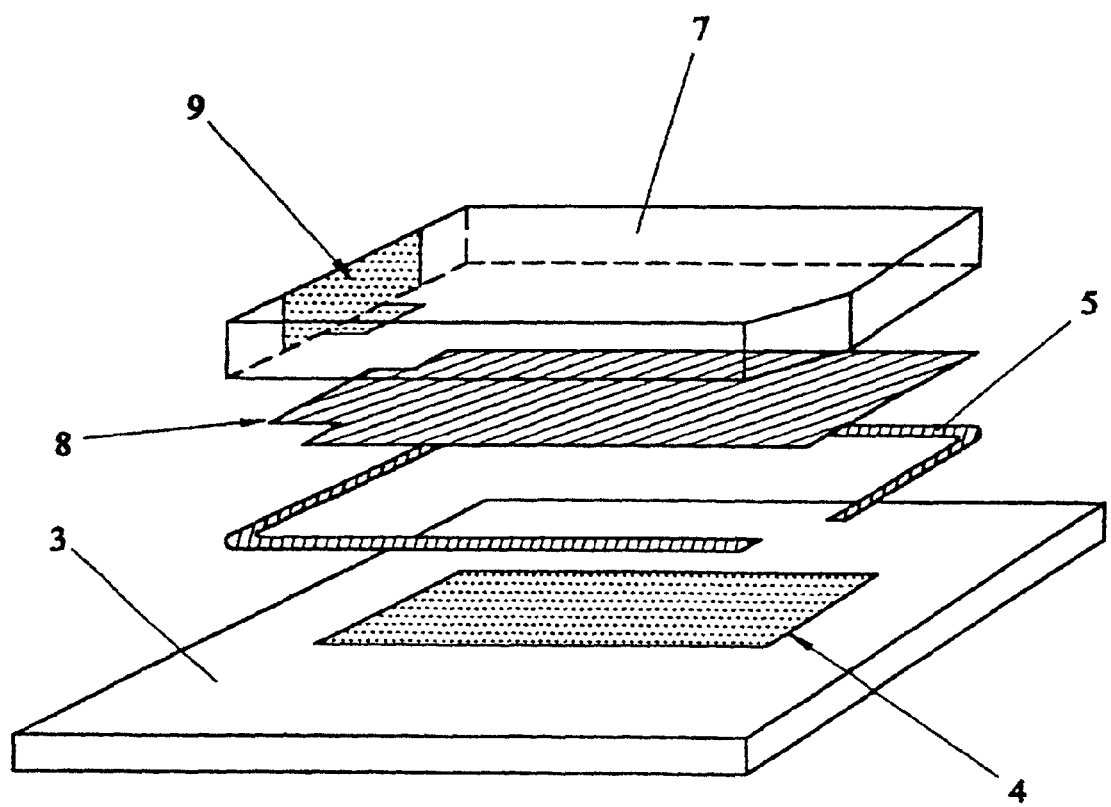
FIG. 2 is an exploded view of components of the liquid crystal cell of FIG. 1.

FIG. 2 shows that the glue seal is broken to permit insertion of the liquid crystal material into the assembled cell, after which the seal is completed, either by more of the same glue, or by any other suitable material or means known per se.

Front electrode 6 comprises a generally rectangular planar glass or silica substrate 7 coated on its underside, facing the backplane 3, with a continuous electrically conducting silk screened indium-tin oxide layer 8. On one edge side of the substrate 7 is provided an evaporated aluminium edge contact 9, which extends round the edge of the substrate and over a portion of the layer 8, thereby providing an electrical connection to the layer 8 in the assembled cell 1.

Insulating spacers 25 formed on the silicon substrate of the backplane 3 extend upwards to locate the front electrode 6 a predetermined, precise and stable distance from the silicon substrate, and liquid crystal material fills the space so defined. As described later, the spacers 25 and the backplane 3 are formed on the silicon substrate simultaneously with formation of the elements of the active backplane thereon, using all or at least some of the same steps.

Figure 3:
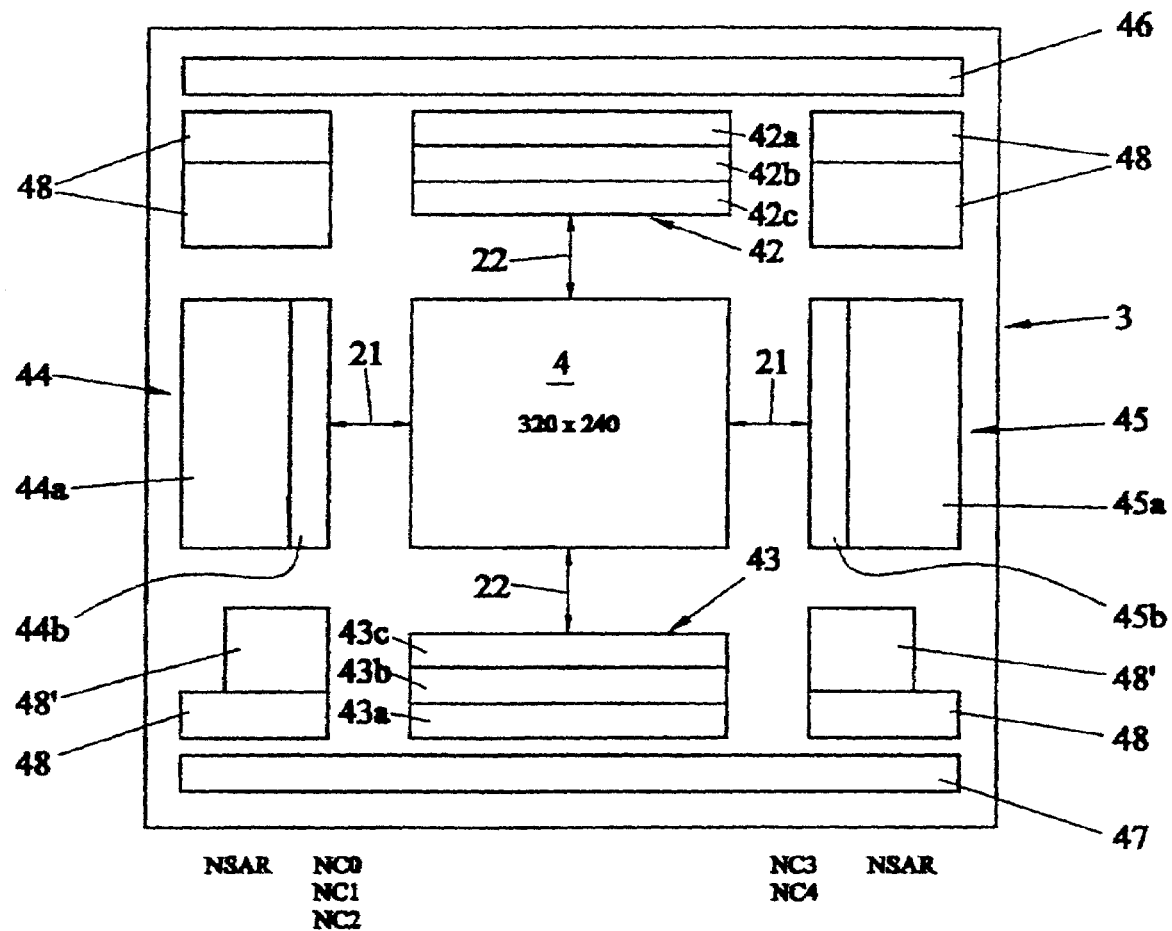
FIG. 3 is a schematic plan view (floorplan) of the active backplane of the liquid crystal cell of FIG. 1, including a central pixel array.

FIG. 3 shows a general schematic view of the layout ("floorplan") of the active backplane 3. As will be described in more detail later with reference to FIGS. 6 and 7, each one of the central array 4 of pixel active elements is composed essentially of an NMOS transistor having a gate connected to one of a set of a row conductors, a drain electrode connected to one of a set of column conductors and a source electrode or region which either is in the form of a mirror electrode or is connected to a mirror electrode. Together with an opposed portion of the common front electrode 6 and interposed chiral smectic liquid crystal material 20, the rear located mirror electrode forms a liquid crystal pixel cell which has capacitive characteristics.

Even and odd row conductors are connected to respective scanners 44, 45 spaced either side of the array. Each scanner comprises a level shifter 44b, 45b interposed between a shift register 44a, 45a and the array. In use, a token signal is passed along the registers to enable (render the associated transistors conductive) individual rows in turn, and by suitable control of the registers different types of scan, e.g. interlaced or non-interlaced, can be performed as desired.

Even and odd column conductors are connected to respective drivers 42, 43 spaced from the top and bottom of the array. Each driver comprises a 32 to 160 demultiplexer 42a, 43a feeding latches 42b, 43b, and a level shifter 42c, 43c between the latches and the column conductors. In use, under the control of a 5-phase clock, data from the memory 24 for successive sets of 32 odd or even column conductors is passed from sets of edge bonding pads 46, 47 to the demultiplexers 42a, 43a, and latched at 42b, 43b before being level shifted at 42c, 43c for supply as a driving voltage to the column conductors. Synchronisation between the row scanning and column driving ensures that the appropriate data driving voltage is applied via the enabled transistors of a row to the liquid crystal pixels, and for this purpose various control circuits 48 are provided.

Subsequent disabling of that row places the transistors in a high impedance state so that charges corresponding to the data are then maintained on the capacitive liquid crystal pixels for an extended period, until the row is again addressed.

The gaps 21 between the level shifters 44b, 45b and the adjacent edges of the array 4 are 1 mm wide, and the gaps 22 between the level shifters 44b, 45b and the adjacent edges of the array 4 are 2 mm wide. These gaps, or glue lanes, are sufficiently large to completely accommodate a glue seal 5 of approximate width of 300 microns while allowing for tolerances in positioning of the seal. As shown in FIG. 1, the size of the front electrode 6 sufficient to cover only the array and most of the glue lanes. In the embodiment the array is 11 mm by 8 mm, and the front electrode is 12.4 mm by 9.4 mm. The provision of the glue lanes, and the assembly of the cell form the subject of our copending application U.S. Ser. No. 09/868,239.

Figure 4:
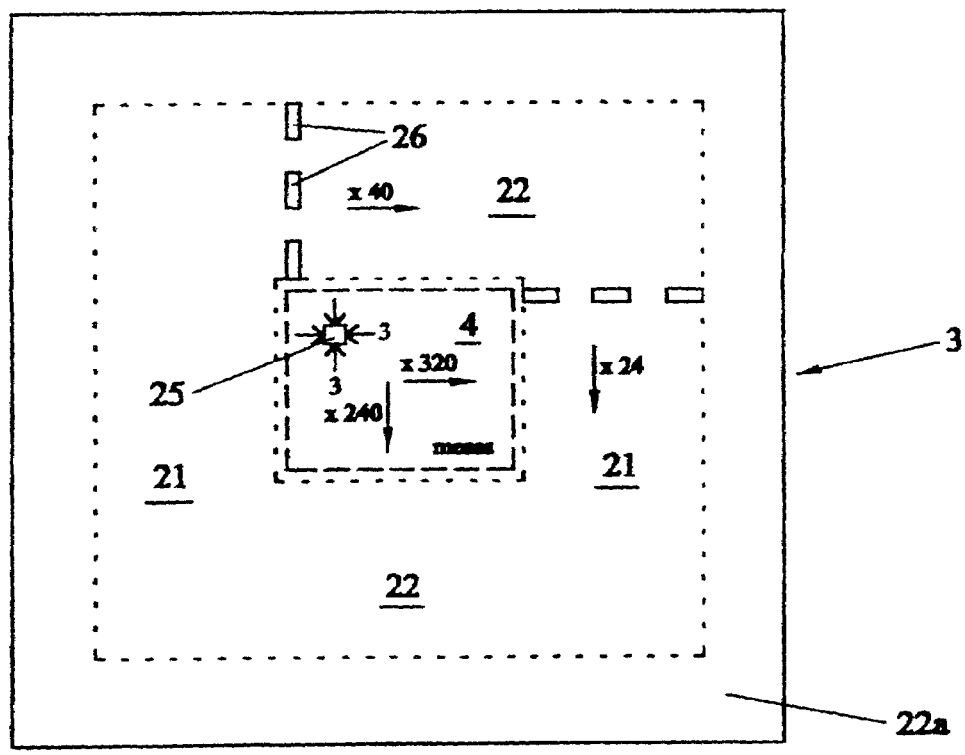
FIG. 4 shows part of the pixel array of FIG. 3 to further illustrate the location of the insulating columns.
Figure 5:
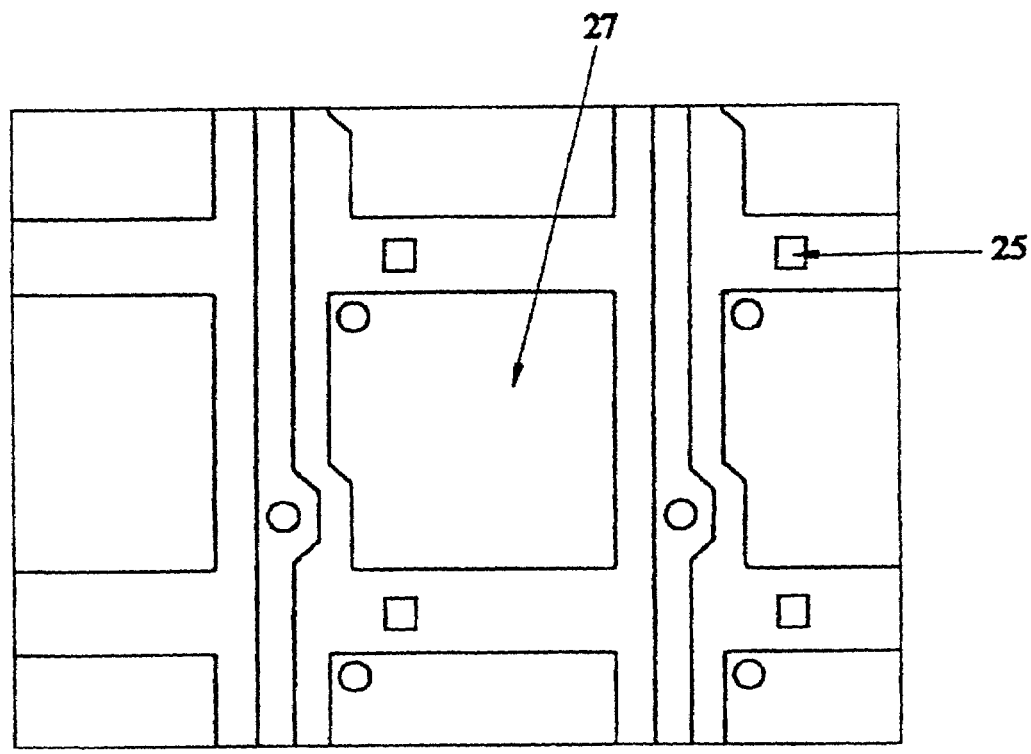
FIG. 5 is a plan view of part of the pixel array of FIG. 3 including a single pixel and its associated insulating column.
Figure 6:
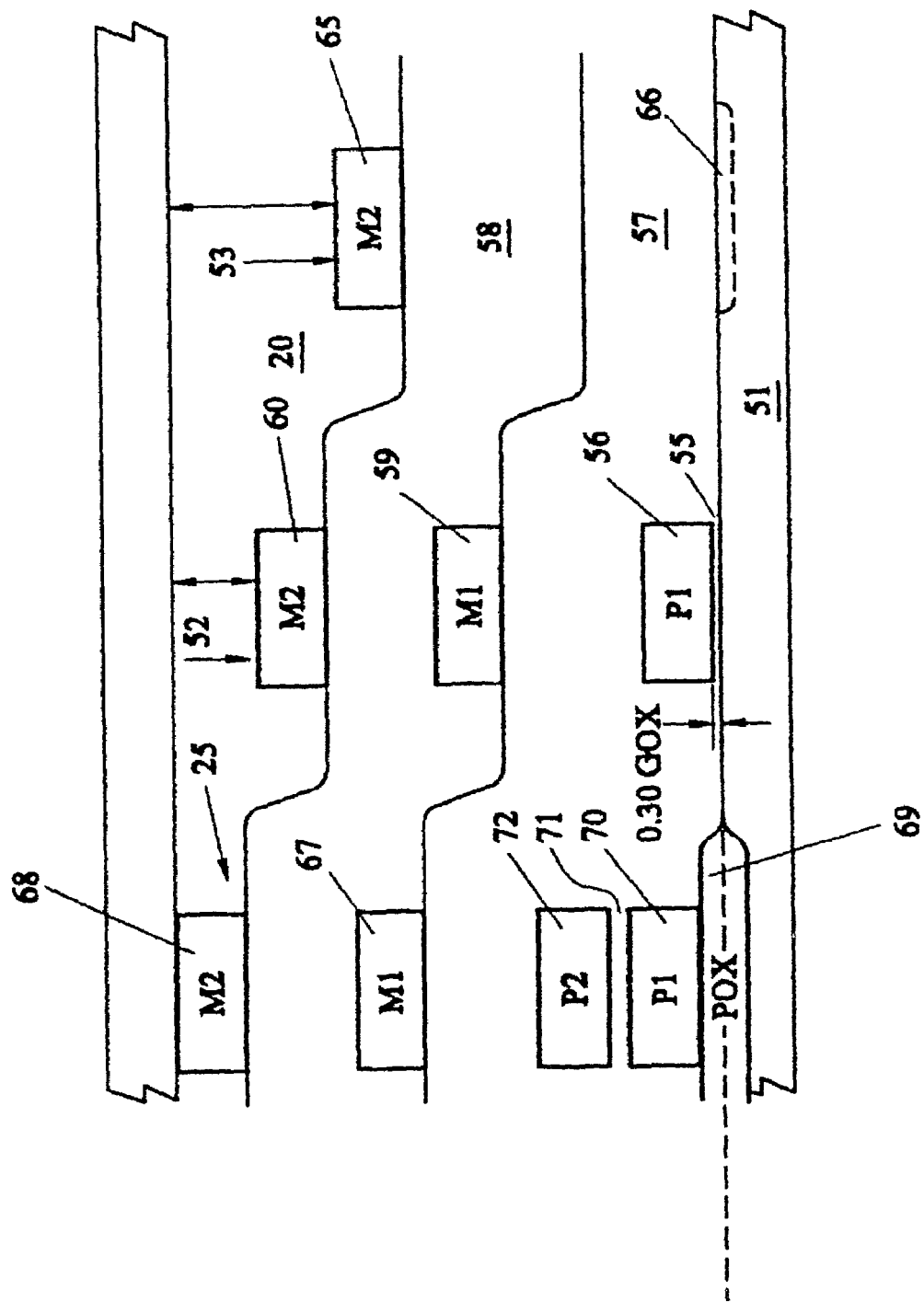
FIG. 6 is a schematic cross sectional view of part of the array of FIG. 3 to illustrate the various layers and heights encountered therein.

As very schematically shown in FIGS. 4 to 6, the spacers 25 are in the form of columns of generally square cross-section (3 microns by 3 microns), integral with the backplane 3, and are evenly distributed over the pixel array, one for each pixel 27.

They are supplemented by spacers 26 evenly distributed in the glue lanes 21, 22 between the pixel array and an out area 22a for the control circuitry (FIG. 3) which is coupled to the array.

The spacers in the glue lanes are in the form of ridges, equal in height to columns 25, but of more elongate form (10 by 100 microns). The insulating pillars and ridges, which are formed simultaneously using the same processing steps, and which extend above the topology of the rest of the backplane, ensure a constant and accurate spacing between the front electrode 6 and the silicon substrate of the backplane 3, to prevent short circuits between the backplane and the front electrode, and to provide electrical and optical uniformity and behaviour in the liquid crystal pixel array.

Figure 7:
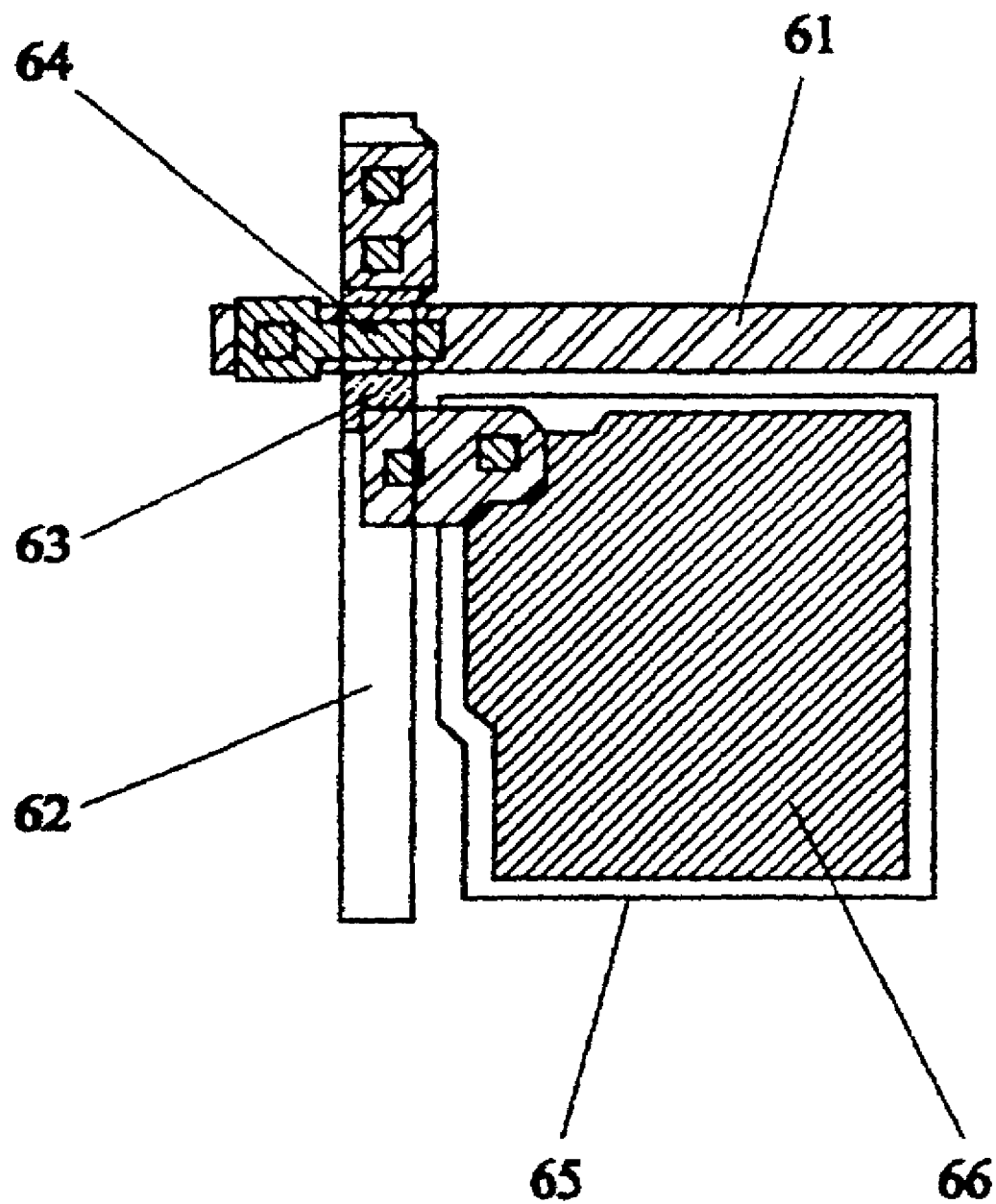
FIG. 7 is a schematic plan view of a single pixel of the array of the backplane of FIG. 3.

As schematically illustrated in FIG. 6, the active backplane is based on a p-type silicon substrate 51. In the region of the array 4 it includes NMOS transistors 52, pixel mirrors 53 and the insulating spacer columns 25, and the substrate 51 is covered first by a lower substantially continuous silicon oxide layer 57 and then by an upper substantially continuous silicon oxide layer 58. It should be noted that FIG. 6 is included merely to illustrate the different heights encountered in the backplane and that the other spatial arrangements of the elements do not correspond to what is found in practice. FIG. 7 shows a plan view of an actual arrangement of transistor and mirror electrode, generally similar to that of FIG. 6, but with the column 25 not shown. Transistors 52 are the highest part of the circuitry itself.

In addition to these layers, the transistor 52 is further defined by a metallic gate electrode 59 on the layer 57 and a metallic drain electrode 60 on layer 58. Electrodes 59 and 60 are portions of a row conductor 61 and a column conductor 62 respectively (see FIG. 7). At the transistor 52, the layer 57 is modified to include a polysilicon region 56 spaced from the substrate 51 by a very thin gate oxide layer 55.

The transistor source is in the form of a large diffusion region 63 (FIG. 7) within the layer 58 which is connected to electrode 65 of the pixel mirror 53, with the gate region 64 being located essentially under the crossover region of the column and row conductors 61, 62 to maximise the fill factor and to protect it from incident light.

The pixel mirror is formed by the pixel electrode 65 on layer 58, which electrode is of the same metal as, and formed simultaneously with, the drain electrode 60. Beneath most of the mirror electrode 65 there is formed an n-type depletion region 66 in the substrate 51. In the assembled device, the pixel electrodes are spaced from the opposed front electrode 6 by somewhat less that 2 microns with smectic liquid crystal material 20 interposed.

The pixel mirror is essentially flat, since there are no underlying discrete circuit elements, and occupies a proportion (fill factor) of around 65% of the pixel area. The need to maximise the fill factor is one consideration in the decision to employ a DRAM type backplane, rather than the SRAM type in which more space needs to be devoted to the two transistors and their associated elements.

The insulating column or pillar 25 which is associated with each pixel extends above the topology of the rest of the backplane, but is also composed of the layers 57, 58 over the substrate 51, with a first metal film 67 between the layers 57, 58 and a second metal film 68 between layer 58 and (in use) the front electrode 22. First and second metal films 67, 68 are of the same metals, and deposited at the same time, as the electrodes 59, 60 of the transistor 52. In the region of the spacer, the substrate is modified to provide a field oxide layer 69, and the bottom of layer 57 is modified to provide two polysilicon layers 70, 72 spaced by a thin oxide layer 71.

Although it includes metallic layers, the spacer provides good insulation between the front electrode and the active backplane. By forming insulating spacers in this manner, it is possible to locate them accurately relative to other elements on the backplane, thereby avoiding any interference with optical or electrical properties. By creating them at the same time as the active and other elements of the backplane, using the same processes, there are advantages in terms of cost and efficiency.

While the fill factor of 65% in the arrangements of FIGS. 1 to 7 is sufficiently high to be acceptable, the reflectivity of the mirror electrode is not optimised, since the material thereof is identical to that used in producing the active elements of the backplane.

It is normal semiconductor foundry practice to supply backplanes with a continuous top insulating layer deposited over the entire plane, and to produce the arrangements of the preceding Figures, it would be necessary to remove this insulating layer, or to avoid having it applied in the first place.

However, by the use of partial or full planarisation of the backplane, the fill factor and reflectivity of the mirror electrode can be increased.

In partial planarisation the top insulating layer is retained, but with vias extending to underlying electrode pads 65, which can be small as they no longer function as mirrors. A respective highly reflective mirror coating is deposited over the majority of the pixel area and is connected to its via.

This construction has advantages, inter alia, of a high fill factor; a highly reflective mirror electrode; and reduced light penetration to the underlying semiconductor material. While it is preferred to retain the insulating columns and ridges to support and space the front electrode relative to the backplane, so reducing the fill factor slightly, these now include the additional top insulating layer. The only post-foundry step is the deposition of the reflective mirror material. It should be noted that the latter is not as flat as previously, owing to the underlying structure of the backplane.

Full planarisation is a known process in which the topology of the backplane is effectively removed by filling with a insulating material, e.g. a polymer. Again, this may be implemented on the present backplane, with or without the top insulating layer introduced at the foundry, and with very flat highly reflective mirror electrodes deposited over each pixel with a high fill factor. However, although the product has the same advantages as partial planarisation, and may be superior in performance, its production by present technologies involves a number of post-foundry steps, some not easily or efficiently performed (such as ensuring the flatness of the insulating material), and so is not preferred at the moment.

When either full or partial planarisation is adopted, the provision of glue lanes becomes rather less necessary insofar as the peripheral logic is covered with an insulating layer, although they can still be provided and used, and assembly of the cell performed, as previously described. Nevertheless, in such a case, provided care is taken to keep the glue well away from the pixel array, it could be deposited anywhere on the insulating top layer outside the array other than on the bonding pads. Preferably the glue can then extend to at least one edge of the lower substrate. For example, in the arrangement of FIG. 3 as modified by planarisation, the two side edges of the upper and lower substrates could both be in exact register, with the glue track/seal located thereat. The requirement for revealed and accessible bonding pads 46, 47 means that the upper substrate will stop short thereof, for example between the pads and the demultiplexers 42*a*, 43*a*, but the glue tracks/seals would be located over active circuitry lying beneath the insulating top layer.

The chiral smectic liquid crystal material is given a desired surface alignment at one or both substrates by means known per se. In the case of the active semiconductor backplane, treatment will be of the partial or full planarisation layer if provided.

It should be understood that although the embodiment is described in relation to a smectic liquid crystal cell, this invention in its first aspect relates to any active backplane, and to any cell construction comprising two spaced opposed substrates, one of which is an active backplane.

The invention claimed is:

1. A backplane comprising:
    an array of electrical or electronic elements, each of said electrical or electronic elements comprising at least a first electronic element layer and a second electronic element layer; and
    and at least one separate spacer which rises higher over the backplane than said array said at least one spacer comprises at least a first spacer layer and a second spacer layer wherein said first spacer layer is formed from substantially the same material as said first electronic element layer and said second spacer layer is formed from substantially the same material as said second electronic element layer and wherein said first and second spacer layers are in the same order in the spacer as first and second electronic element layers appear in said electrical or electronic elements.

2. A backplane according to claim 1 wherein the backplane is a semiconductor backplane.

3. A backplane according to claim 1 wherein said at least one spacer includes at least one additional space layer, said at least one additional spacer layer and said first and second spacer layers forming a series of more than two layers.

4. A backplane according to claim 1 wherein all the layers in the spacer correspond in material and order to all the layers in said at least one electrical or electronic element.

5. A backplane according to claim 1 wherein the spacer is electrically insulating between a top and bottom of said spacer.

6. A backplane according to claim 1 wherein there is a plurality of said spacers distributed over the backplane.

7. A backplane according to claim 6 wherein at least some of the spacers are regularly distributed over the array.

8. A backplane according to claim 6 wherein the array provides a plurality of addressable locations, and each location has at least one said spacer associated therewith.

9. A backplane according to claim 8 wherein each location has only one said spacer associated therewith.

10. A backplane according to claim 6 wherein at least one said spacer is in the form of a column having a generally square cross-section.

11. A backplane according to claim 6 wherein at least one said spacer is in the form of a ridge having an elongate cross-section.

12. A backplane according to claim 1 wherein said array is covered by an insulating layer which also extends over the said spacer or said plurality of spacers.

13. A backplane according to claim 12 wherein said insulating layer has a generally constant thickness.

14. A backplane according to claim 12 wherein the upper surface of said insulating layer is substantially flat.

15. A backplane according to claim 12 wherein an electrode is deposited on said insulating layer and is coupled to a said element of said array.

16. A backplane according to claim 15 wherein said electrode is reflective.

17. A backplane according to claim 16 wherein the reflectivity of the electrode is greater than the reflectivity of conductive layers occurring in the electrical or electronic element and/or spacers of the array.

18. A backplane according to claim 1 wherein the top surface thereof is treated in a manner to induce liquid crystal alignment.

19. A backplane according to claim 1 wherein the backplane is an active backplane in which the array comprises active electronic elements.

20. A backplane according to claim 1 wherein at least some of the spacers are located externally of the array.

21. A backplane according to claim 1 wherein the array is connected to other circuitry formed on the backplane but spaced from the array by a lane.

22. A backplane according to claim 21 wherein said externally located spacers are located in said lane.

23. A backplane according to claim 21 wherein the said lane is of sufficient width to permit the presence of an adhesive sealing strip without substantial contact with the array and said other circuitry.

24. A backplane according to claim 21 wherein the width of the lane is least 500 microns.

25. A backplane according to claim 24 wherein the width of the lane is least 1500 microns.

26. A backplane according to claim 21 wherein the said circuitry connected to the array comprises logic for addressing elements of the array.

27. A method of producing a backplane as defined in claim 1, wherein processes used for making parts of at least one said element are also used simultaneously to form parts of said spacers.

28. A cell comprising a backplane as defined in claim 1 and an opposed electrode sealed thereto in spaced relation.

29. A cell according to claim 28 wherein liquid crystal material is located between the electrode and the backplane.

30. A cell according to claim 29 wherein the liquid crystal material has a smectic phase.

31. A method of producing a backplane having at least one region containing an array of electrical or electronic elements and at least one separate spacer which rises higher over the backplane than said elements, said at least one spacer being laterally spaced from said elements, wherein the processes used for making parts of at least one said element are also used simultaneously to form parts of said at least one spacerspacers on the backplane laterally spaced from said elements.

32. A method according to claim 31 wherein said backplane is a semiconductor backplane.

33. A method of producing a backplane according to claim 31 wherein the spacers comprise at least two layers of substantially the same material and occurring in the same order as is found in at least one said electrical or electronic element.

* * * * *

UNITED STATES PATENT AND TRADEMARK OFFICE
CERTIFICATE OF CORRECTION

| | | |
|---|---|---|
| PATENT NO. | : 7,257,007 B2 | Page 1 of 1 |
| APPLICATION NO. | : 10/084652 | |
| DATED | : August 14, 2007 | |
| INVENTOR(S) | : Wilkinson et al. | |

It is certified that error appears in the above-identified patent and that said Letters Patent is hereby corrected as shown below:

Title Page
(30) "Dec. 16, 1999" should read --Dec. 19, 1998--.

Signed and Sealed this

Sixth Day of January, 2009

JON W. DUDAS
*Director of the United States Patent and Trademark Office*